United States Patent Office 3,548,039
Patented Dec. 15, 1970

3,548,039
PROCESS FOR PRODUCING CYCLIC CATECHOL ESTERS OF PHOSPHONIC ACID
Robert Walter Wynn, Easton, Pa., assignor to GAF Corporation, New York, N.Y., a corporation of Delaware
No Drawing. Filed Apr. 27, 1967, Ser. No. 634,119
Int. Cl. C07d 105/04; A01n 9/36
U.S. Cl. 260—982                7 Claims

ABSTRACT OF THE DISCLOSURE

A process for producing catechol and substituted catechol cyclic esters of beta-haloethylphosphonic acid, and in particular, the catechol cyclic ester of beta-chloroethylphosphonic acid. having plant growth regulating properties, including control of apical dominance. The 2-chloroethyl ether of beta-chloroethlphosphonic acid chloride is reacted with catechol to produce 2-chloroethyl 2-hydroxyphenyl beta-chloroethylphosphonate, a novel intermediate, which is heated in the presence of a toluenesulfonic acid, monohydrate catalyst to produce the catechol cyclic ester of beta-chloroethylphosphonic acid. The 2-chloroethyl ester of beta-chloroethylphosphonic acid chloride employed as a starting material may be prepared by contacting bis(2-chloroethyl)beta-chloroethylphosphonate with phosphorous pentachloride.

---

This invention relates to the preparation of an ester of phosphonic acid and more particularly to the preparation of both catechol and substituted catechol cyclic esters of beta-haloethylphosphonic acid and a novel intermediate for producing such cyclic esters.

Kabachnik et al. Bull. Acad. Sci. U.R.S.S. Classe Sci. Chem. 1947, 97–100 (Chem. Abstracts 42, 3132e) discloses a process for producing the catechol cyclic ester of betachloroethylphosphonic acid from 2-chloroethylphosphonyl dichloride. This process suffers from the disadvantages that the production of 2-chloroethylphosphonyl dichloride in high yields is difficult, and in addition, involves a high pressure reaction.

Accordingly, an object of this invention is to provide a new and improved process for producing catechol and substituted catechol cyclic esters of beta-haloethylphosphonic acid.

Another object of this invention is to provide a process for producing the above esters in good yields.

A further object of this invention is to provide an intermediate for producing the above esters.

Yet another object of this invention is to provide a process for producing the above esters under normal pressure.

A still further object of this invention is to provide a process that is particularly suitable for producing the catechol cyclic ester of beta-chloroethylphosphonic acid.

These and other objects will be more readily apparent from reading the following detailed description of the invention.

The objects of this invention are accomplished in one aspect by producing catechol and substituted catechol cyclic esters of beta-haloethylphosphonic acid by a series of reactions represented by the following equations:

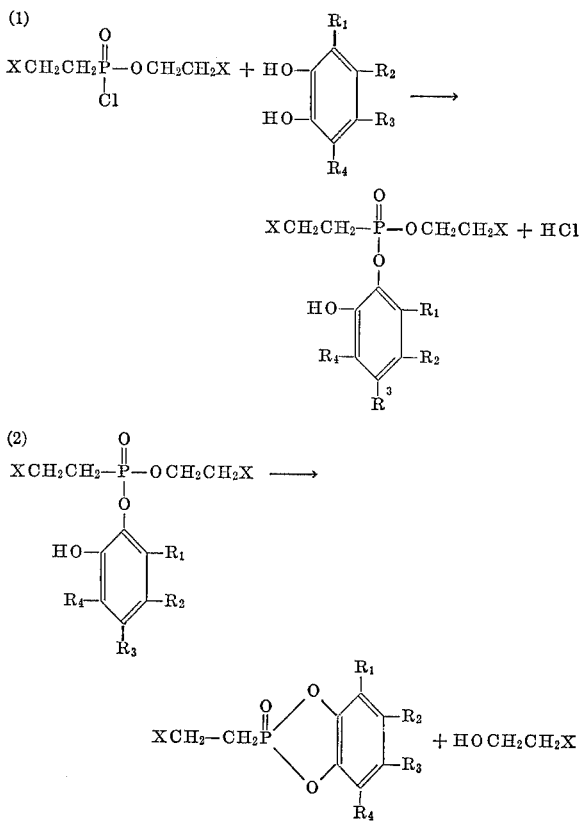

wherein X is a halo group, such as fluoro, chloro, bromo, or iodo, preferably chloro or bromo and $R_1$, $R_2$, $R_3$ and $R_4$ are either hydrogen or substituent groups that are not strongly negative, such as halo, alkyl, alkoxy, preferably lower alkyl or lower alkoxy, and may be the same or different groups and two of the substituent groups may form a condensed ring, either a hydrogenated or a non-hydrogenated condensed ring.

The starting material of Equation 1, in accordance with the overall process of the invention, may be produced by a reaction represented by the following equation:

(3)   $XCH_2CH_2\overset{O}{\overset{\|}{P}}-(OCH_2CH_2X)_2 + PCl_5 \longrightarrow$

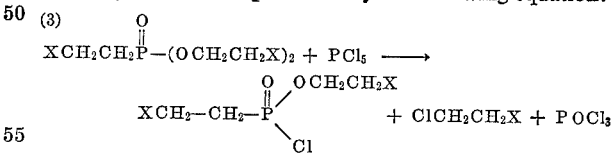

wherein X is as defined above.

The process will be described in more detail with reference to the production of the catechol cyclic ester of beta-chloroethylphosphonic acid, but it is to be understood that the following description of the process is equally applicable to the production of the other cyclic esters, as hereinabove defined in Equations 1 and 2.

In accordance with the process of the invention, the 2-chloroethyl ester of beta-chloroethylphosphonic acid chloride is reacted with catechol, at a temperature between about 20° C. and about 100° C. The reactants are generally employed in about stoichiometric amounts, although the mole ratio of catechol to ester may vary between about 0.8:1 and about 1.2:1. Higher mole ratios of catechol to ester may also be employed but such excesses of catechol make recovery of the final product by distillation more difficult. The reaction proceeds rapidly, with evolution of hydrogen chloride, which is separated from the reaction mixture as known in the art, e.g., by employing a nitrogen sweep gas.

The intermediate product produced by the above reaction, 2-chloroethyl 2-hydroxyphenyl beta-chloroethylphosphonate, is then heated to a temperature between about 100° C. and about 165° C., preferably between about 110° C. and about 150° C., in the presence of either an organic or inorganic acid catalyst, such as p-toluenesulfonic acid, monohydrate, phosphoric acid, sulfuric acid and the like, to produce the catechol cyclic ester of beta-chloroethylphosphonic acid. The catalyst is generally employed in an amount that ranges between about 0.5 and about 5 parts, by weight per a part of ester. The 2-chloroethylphosphonate may be heated in the presence of the catalyst without prior purification, and in fact, may be treated in the reactor in which produced.

The 2-chloroethyl ester of beta-chloroethylphosphonic acid chloride employed as a starting material may be produced, in accordance with the overall process of the invention, by reacting phosphorous pentachloride with bis(2-chloroethyl)beta-chloroethylphosphonate at a temperature between about 50° C. and about 125° C., preferably at about 103°–106° C. Although the reaction between the ester and the phosphorous pentachloride may be effected with any mole ratio of reactants, a mole ratio of phosphorous pentachloride to ester ranging between about 1:1 and about 2:1 favors the production of the 2-chloroethyl ester of 2-beta-chloroethylphosphonic acid chloride, with the lower mole ratios within the above range giving the best results. Consequently, it is generally preferred to employ about stoichiometric quantities of the reactants, since such quantities reduce the amount of 2-chloroethylphosphonyl dichloride formed as by-product.

In addition to the 2-chloroethyl ester of beta-chloroethylphosphonic acid chloride and beta-chloroethylphosphonyl dichloride, 1,2-dichloroethane and phosphorous oxychloride are formed as by-products. Since these by-products are volatile at temperatures about 107° C., such compounds may readily be distilled from the reaction mixture either during the reaction or after the reaction is completed. The remaining products of the reaction, the 2-chloroethyl ester of beta-chloroethylphosphonic acid chloride and beta-chloroethylphosphonyl dichloride, may be recovered by distillation, e.g., distillation under vacuum, and the product mixture reacted with catechol, without fractionation, since the dichloride reacts with catechol to produce the desired product.

The bis(2 - chloroethyl)beta-chloroethylphosphonate which is reacted with the phosphorous pentachloride, as hereinabove described, may be produced as known in the art. Thus, for example, tris(2-chloroethyl)phosphite may be heated in the absence of a diluent to effect isomerization thereof to bis(2-chloroethyl)beta-chloroethylphosphonate, as taught by Kabachnik, Izvest. akad. Nauk. S.S.S.R. Otdel. Khim. Nauk. 1946 403 [C.A. 42 7242 (1948)] also reported in Organic Reactions, vol. VI, pages 287–8. This reaction, however, is violently exothermic (almost explosive) and very dangerous on a large scale. Consequently, it is preferred to effect the isomerization in the presence of an inert organic diluent such as o-dichlorobenzene, cumene, xylene, and the like, at an elevated temperature, for example about 160° C. The organic diluent moderates the isomerization sufficiently to enable large scale production of the phosphonate ester. The isomerization reaction in the presence of a diluent is further described in German Patent 964,046 of Mar. 16, 1957 and by Gefter (C.A. 53 1120a) Zhur. Obshchei Khim 28 1908 (1958).

The following examples are illustrative of the invention but the scope of the invention is not to be limited thereby.

EXAMPLE I

This example illustrates the preparation of the 2-chloroethyl ester of beta-chloroethylphosphonic acid chloride.

335.5 grams (1.245 moles) of bis(2-chloroethyl)beta-chloroethylphosphonate were placed in a pot and 325 grams (1.56 moles) of phosphorous pentachloride were added thereto in incremental portions over a one-half hour period. During the addition, the mixture was kept at a temperature below 80° C., by employing an ice-water bath, in order to prevent volatilization of ethylene dichloride which would hinder the introduction of the phosphorous pentachloride. The mixture was then refluxed for two hours at a temperature of 103–106° C.

After the two hour period, the volatile material was distilled from the reaction mixture at a bottoms temperature ranging from 105°–156° C. and an overhead temperature ranging from 80° to 102° C. 354.5 grams of distillate and 287.2 grams of residue were recovered.

The residue was distilled under vacuum and after an initial distillate of 13 cc. at 75–82° C./4 mm. 250.7 grams (89% theory) of the main product, boiling at 70°–123° C./0.8 mm., were collected.

EXAMPLE II

This example illustrates the preparation of the catechol cyclic ester of beta-chloroethylphosphonic acid.

583.5 grams (5.3 moles) of catechol were mixed with a 200 gram portion of a total of 1190 grams (5.3 moles) of the 2-chloroethyl ester of beta-chloroethylphosphonic acid chloride, which was prepared by the procedure described in Example I. The mixture was stirred and heated at about 40° C. to form a homogeneous mixture. The remaining portion of the ester was added to the mixture, in a thin stream, at a temperature between 40–100° C. over a one hour period while withdrawing hydrogen chloride with a stream of nitrogen gas. The temperature was then slowly increased to 131° C. at which point no further evolution of hydrogen chloride could be detected. The last traces of hydrogen chloride were removed by adding 200 milliliters of benzene and heating the mixture to 123° C. under an aspirator vacuum.

17.5 grams of p-toulenesulfonic acid, monohydrate catalyst were added to the mixture, containing 2-chloroethyl-2-hydroxyphenyl-beta-chloroethylphosphonate and the temperature thereof was slowly increased from 123° C. to 165° C. over a period of 12.5 hours while removing volatiles with a stream of nitrogen at a pressure of 4–5.5 mm. The pressure was then further reduced and after recovering 5.2 grams of an initial distillate at 117–120° C./.09 mm., there was recovered 1044.3 grams (90% of theory) of final product the catechol cyclic ester of beta-chloroethylphosphonic acid boiling at 112–131° C./.05 mm.

The procedure of Examples I and II is also employed to produce the catechol cyclic ester of beta-bromoethylphosphonic acid from bis(2-bromoethyl)beta-bromoethylphosphonate.

EXAMPLE III

The substituted catechol cyclic esters of both beta-chloroethylphosphonic and beta-bromoethylphosphonic acid are prepared by the procedures of Examples I and II from the following substituted catechols.

(A) 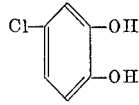

(B) 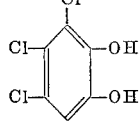

(C) 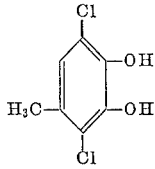

(D) 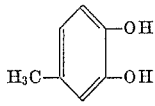

(E) 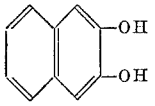

(F) 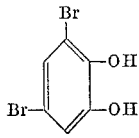

The catechol and substituted catechol cyclic esters of beta-haloethylphosphonic acid produced by the process of the invention may be either transesterified with an alcohol or hydrolyzed to produce novel esters and half esters, respectively, of beta-haloethylphosphonic acid. Thus, for example, the catechol cyclic ester of beta-chloroethylphosphonic acid may be hydrolyzed at about room temperature to produce the catechol half ester of beta-chloroethylphosphonic acid. Alternatively, for example, the catechol cyclic ester of beta-chloroethylphosphonic acid may be transesterified with an alcohol, such as ethanol, to produce ethyl 2-hydroxyphenyl beta-chloroethylphosphonate. These esters and half esters have valuable plant growth regulating properties, including the ability to control apical dominance. These esters and half esters are generally employed as aqueous solutions or emulsions and are sprayed onto the plants in amounts to provide between about 0.1 lb. and about 16 lbs. or higher, of the ester or half ester per acre of plants. The preparation and use of these esters and half esters of beta-haloethylphosphonic acid are described in more detail in application Ser. No. 617,819, filed on Feb. 23, 1967 and application Ser. No. 617,820, filed on Feb. 23, 1967, respectively, both hereby incorporated by reference.

The process of the invention is particularly effective for producing catechol and substituted catechol cyclic esters of beta-haloethylphosphonic acid and is less costly than those heretofore known in the art since there is no necessity to purify intermediate products and the requirements of phosphorous pentachloride, a costly material, for the overall process are reduced. In addition, the process results in good yields of final product and is operable at atmospheric pressure thereby avoiding the necessity for a pressure reaction.

I claim:
1. A process for producing a compound (1) having the following structural formula:

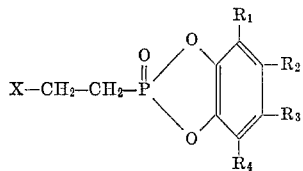

wherein X is a halo group, $R_1$, $R_2$, $R_3$ and $R_4$ are selected from the group consisting of hydrogen, lower alkyl, bromine, chlorine and wherein substituents $R_2$ and $R_3$ taken together with the phenyl ring to which they are attached form a naphthalene nucleus, comprising: (a) reacting at a temperature between about 20° C. and about 100° C. a compound (II) represented by the following structural formula:

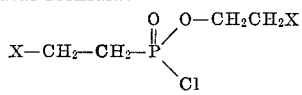

wherein X is as defined above, with a compound (III) represented by the following structural formula:

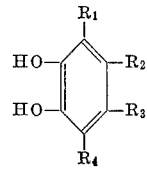

wherein $R_1$–$R_4$ is as defined above, to produce a compound (IV) represented by the following structural formula:

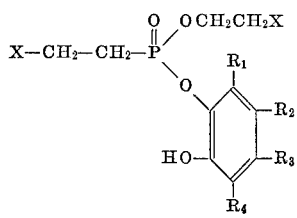

wherein X and $R_1$–$R_4$ are as defined above and (b) heating compound (IV) at a temperature between about 100° C. and 165° C. in the presence of an acid catalyst selected from the group consisting of sulfuric acid, phosphoric acid and p-toluene sulfonic acid monohydrate to produce compound (I).

2. The process as defined in claim 1 wherein at least one of the $R_1$, $R_2$, $R_3$ and $R_4$ groups is selected from the group consisting of bromine and chlorine and the remaining groups are hydrogen.

3. The process as defined in claim 1 wherein one of the $R_1$, $R_2$, $R_3$ and $R_4$ groups is lower alkyl and the remaining groups are hydrogen.

4. The process as defined in claim 1 wherein $R_1$, $R_2$, $R_3$ and $R_4$ are hydrogen.

5. The process as defined in claim 4 wherein X is bromo.

6. The process as defined in claim 4 wherein X is chloro.

7. The process as defined in claim 1 wherein the catalyst is p-toluene sulfonic acid, monohydrate.

References Cited

Kabachnik et al.: "Chem. Abstracts," vol. 42, 7241–3 (1948).

CHARLES B. PARKER, Primary Examiner

A. H. SUTTO, Assistant Examiner

U.S. Cl. X.R.

71—76, 86; 260—953, 973, 986